United States Patent [19]

Marinoff

[11] 4,207,578
[45] Jun. 10, 1980

[54] CATCH TROUGH FOR A JET DROP RECORDER

[75] Inventor: George Marinoff, Dayton, Ohio

[73] Assignee: The Mead Corporation, Dayton, Ohio

[21] Appl. No.: 1,701

[22] Filed: Jan. 8, 1979

[51] Int. Cl.² ............................................. G01D 15/18
[52] U.S. Cl. ....................................................... 346/75
[58] Field of Search ........................................... 346/75

[56] References Cited

U.S. PATENT DOCUMENTS

| | | | |
|---|---|---|---|
| 3,298,030 | 1/1967 | Lewis et al. | 346/75 |
| 3,839,721 | 10/1974 | Chen et al. | 346/75 |
| 3,891,121 | 6/1975 | Stoneburner | 346/75 X |
| 3,970,222 | 7/1976 | Duffield | 346/75 X |
| 4,031,561 | 6/1977 | Paranjpe | 346/75 X |
| 4,081,804 | 3/1978 | Van Breemen et al. | 346/75 |
| 4,160,982 | 7/1979 | Keur | 346/75 |

*Primary Examiner*—George H. Miller, Jr.
*Attorney, Agent, or Firm*—Biebel, French & Nauman

[57] ABSTRACT

An ink receiving aperture is provided on the printing sheet support medium for an ink jet copier. At startup, excess flushing fluid, ink, and ink blobs which may be expelled from the jet array are caught in the trough and removed. The ink catching aperture avoids the need to mechanically displace either the printing head or the print support medium during startup.

9 Claims, 4 Drawing Figures

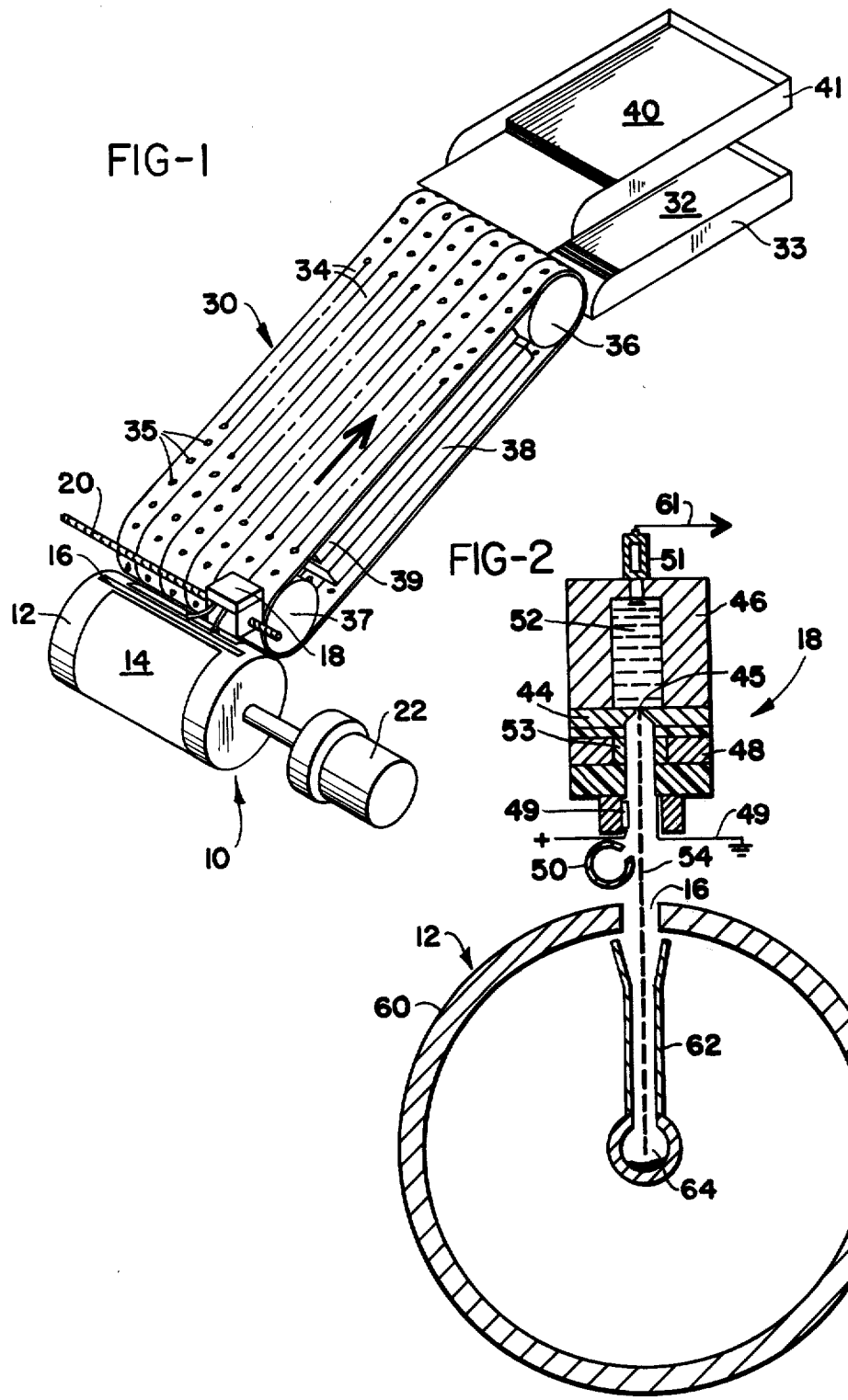

CATCH TROUGH FOR A JET DROP RECORDER

BACKGROUND OF THE INVENTION

This invention relates to printing and copying devices and more particularly to such devices wherein recording is accomplished by means of a noncontact jet drop print head. The general principles of ink jet printing are illustrated by the type of recorders taught by Beam, U.S. Pat. No. 3,577,198, and Mathis, U.S. Pat. No. 3,701,998. Such jet drop recorders comprise a series of electrical and fluidic components, including an orifice plate and a charge plate arranged in laminar relationship for generating one or more rows of jets and selectively charging drops originating therefrom. Typically there may be about 250 or more jets formed in each such row, and each jet is stimulated to produce drops at the rate of about 40 Kilohertz.

All such drops fall through an electrical deflection field, and those which are charged are deflected into a catcher device. The uncharged drops, after passing through the field, are deposited on a print medium. Depending on the particular printing configuration utilized, the print medium may be a moving web of paper, a sheet of paper supported on a rotary drum, or a sheet of paper supported on an endless conveyor belt. For example, the above mentioned Mathis patent prints on a moving web transported below the printing head. Behane et al, U.S. Pat. No. 3,604,846, Loughren, U.S. Pat. No. Re. 27,555, and Fox et al, U.S. Pat. No. 4,063,254, all print onto a sheet of paper supported on a rotary drum. An endless conveyor belt printing support device is shown by Gamblin and Marinoff in a commonly assigned application entitled "RECIPROCATING PAPER HANDLING APPARATUS FOR USE IN AN INK JET COPIER" filed on even date herewith.

However, no matter what printing configuration is utilized, one of the most difficult problems in the operation of such jet drop recording devices is that of achieving satisfactory startup. When ink of other recording liquid is pumped into an initially empty recording head, the jets do not begin to flow freely but rather tend to blob and run together. This wets the top surface of the charge plate, including electrical lead lines plated thereon and ring-type charging electrodes connected thereto. Once such wetting has occurred, it is impossible to perform satisfactory drop charging, and any attempt at normal operation can result in shorting out of the lead lines and the charging electrodes. Also, liquid on top of the charge plate may affect jet straightness. Thus, in early designs of jet drop recording apparatus it was necessary to follow the startup step with a difficult cleaning step which was conducted while the jets were running. Not until after this cleanup operation was the apparatus ready for recording.

Numerous attempts have been made to achieve satisfactory startup. Martinez et al, U.S. Pat. No. 3,661,304, teaches use of a shock wave to force ink through a jet forming orifice at high energy. This method avoids blobbing at the exit side of the orifice and is fairly satisfactory for starting up a single jet. However, the technique has not been found to be satisfactory in starting up the large numbers of jets required for high speed printing and copying.

Satisfactory startup methods for large numbers of jets are disclosed in Stoneburner, U.S. Pat. No. 3,891,121, and Duffield, U.S. Pat. No. 3,970,222. In those methods, a source of pressurized air is connected to the recording head, and high pressure air is pumped into the head prior to the admission of ink. Once a flow of pressurized air has been established through the jet forming orifices, ink is pumped into the recording head. When the ink follows the pressurized air in this manner, startup is facilitated without any wetting of the charging electrodes.

As further taught by Stoneburner, startup may be improved by pumping a flush fluid through the recording head after the flow of pressurized air has commenced and before admission of ink. The flush fluid forms free flowing jets, and after these jets have been established, the flush fluid is replaced with ink.

Other startup methods involve moving the charge plate or the entire printing head assembly out of their normal positions during startup. Paranjpe, U.S. Pat. No. 4,031,561, teaches placing a movable charge plate in close contact with an orifice plate during startup operations of an ink jet recorder; after startup, the charge plate is returned to its normal position. Van Breemen et al, U.S. Pat. No. 4,081,804, teaches retracting the print web transport mechanism in an ink jet recorder during startup and replacing it with a catch pan until ink jet flow has been stabilized and adjusted. Chen et al, U.S. Pat. No. 3,839,721, shows a vapor chamber which is moved into position as the charge electrodes are withdrawn to prevent collection of dried ink and spraying during shutdown of an ink jet recorder.

Still other startup methods have displaced the printing head assembly from its operation position with respect to a printing web so that a catch trough can be positioned between the printing head and web. However, the movement of the printing head tends to dislodge accumulated particulate matter previously deposited in the printing head and associated fluid lines and valves so that during startup this dislodged particulate matter may plug the jet orifices and render them inoperative.

Accordingly, the need still exists in the art for providing a startup assist procedure which avoids mechanical displacement of an ink jet printing head assembly and its resultant problems, and at the same time provides a convenient mode of disposal for the flushing fluid and excess ink expelled from the orifices during startup and prior to printing.

SUMMARY OF THE INVENTION

The present invention avoids the need for mechanical displacement of a jet printing head during startup in either a rotary drum or endless conveyor belt ink jet copying system by providing a slot in the drum or belt arrangement. During startup, the slot in the drum or belt is positioned directly below the printing head. This positioning can be accomplished in a known manner by electromechanically orienting the drum or belt so that the slot is in alignment with the center line of the direction of travel of the ink jets when the system is in the startup mode.

As flushing fluid and/or excess ink is expelled from the printing head orifices during startup, the jet streams pass through the slot and into the interior of the drum or belt assembly where they are received by a stationary catcher trough. After startup, a sheet of paper is loaded onto the drum and the drum rotated beneath the printing head. Alternatively, when an endless conveyor belt paper handling system is being utilized, the sheet of paper is loaded onto the belt and the belt reciprocated beneath the printing head. In both embodiments, printing is thereafter accomplished in a conventional manner. Utilizing the present invention, neither the printing head nor the catcher trough is required to move from its established position.

It is therefore seen that it is an object of this invention to provide assistance during startup of a rotary drum or endless belt ink jet copying system; further, it is an object of the present invention to provide apparatus and method for collecting and removing excess fluid generated during startup of an ink jet recording device without the need for mechanical displacement of either the jet printing head or printing medium support apparatus during such startup. Other objects and advantages of this invention will be apparent from the following description, the accompanying drawings, and the appended claims.

BRIEF DESCRIPTION OF THE DRAWINGS

FIG. 1 is a perspective view of a slotted rotary drum copying system which operates in accordance with this invention;

FIG. 2 is a cross-sectional view of the rotary drum and jet drop printing head illustrated in FIG. 1;

DESCRIPTION OF THE PREFERRED EMBODIMENTS

Figure 3:
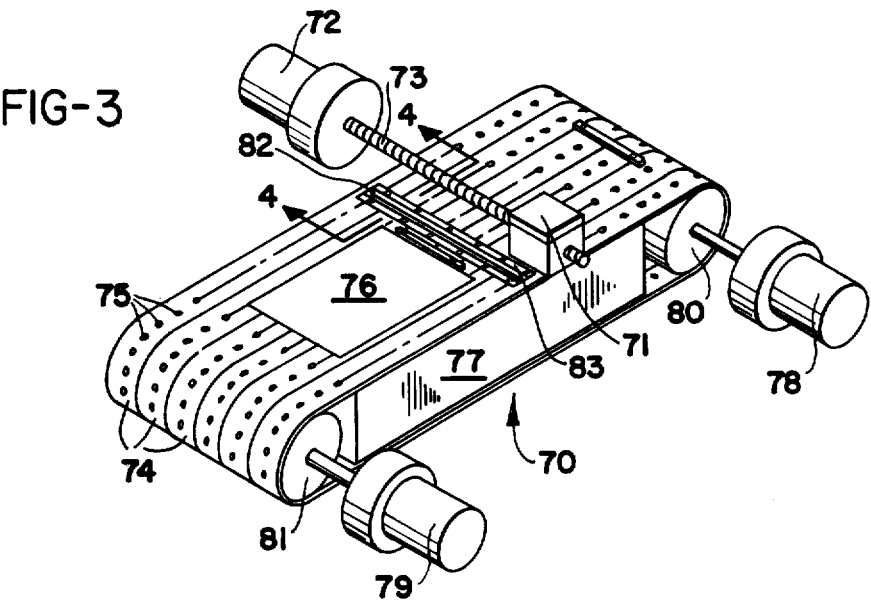
FIG. 3 is a perspective view of a slotted endless conveyor belt copying system which operates in accordance with this invention.

An ink jet copier operating in accordance with this invention will typically comprise a document illumination station, a scanning system, a printing system, and a paper transport system such as the copier disclosed in Paranjpe et al, U.S. Pat. No. 4,112,469, herein incorporated by reference. For ease of understanding, only the printing and transport system have been illustrated in FIG. 1.

Printing system 10 comprises a rotary drum 12 having a sheet of paper 14 thereon and a fluid receiving aperture 16 therein. Printing head 18 supported on worm 20 and driven by a synchronous motor (not shown) is positioned above drum 12 directly over aperture 16. Printing head 18 is connected by wires 19 to a control means which coordinates printing with drum rotation. Drum 12 is connected to an air line (not shown) and has a perforated surface for vacuum mounting of print sheet 14. Drum 12 is rotated by drive motor 22 which is commonly controlled in conjunction with printing head 18 to control drum rotation speed and positioning during a copying cycle.

Paper transport system 30 supplies individual sheets of paper 14 to drum 12 from a paper supply stack 32 in supply tray 33. A paper feed arrangement known in the art (not shown) feeds the print sheets to a series of belts 34 which travel continuously about a pair of rollers 36 and 37.

Belts 34 transport the print sheets 14 by vacuum forces through perforations 35 in the belts. For this purpose, there are provided a lower plenum 38 and an upper plenum 39, both of which are connected to a vacuum source. Rollers 36 and 37 are also connected to air supplies capably of controllably applying either pressure or vacuum to the interiors of the rollers. The rollers have segmented slits which coordinate with perforations 34 in belts 35 so that a sheet 14 being transported therepast can be gripped against belt 34 or separated therefrom.

A pneumatic system (not shown) selectively controls the application of either pressure or vacuum to drum 12 and rollers 36 and 37. The pneumatic system is activated by paper sensors near rollers 36 and 37 and by a trip switch activated by contact with printing head 18.

Printing head 18 is preferably of laminar construction as generally taught by Beam et al, U.S. Pat. No. 3,586,907, and produces an array of longitudinally spaced jets. If desired, the printing head may produce an array of jets arranged in two parallel rows as taught by Mathis, U.S. Pat. No. 3,701,998. Typically, each orifice will have a diameter of about 0.04 mm, and the orifices are spaced on 0.5 mm centers. The desired degree of resolution of the copy will dictate which printing head design and spacing which will be used.

Additional details of printing head 18 and drum 12 are shown in FIG. 2 where the primary elements of the printing head a fluid supply manifold 46, orifice plate 44, charge ring plate 48, deflection electrodes 49, and catcher 50. The manifold 46 contains a supply of printing ink 52 which flows under pressure through orifices 45 to form a row of streams.

During startup, drum 12 is aligned so that aperture 16 is aligned directly beneath printing head 18. Stream 54 issuing from manifold 46 will initially be somewhat erratic with flushing fluid or fresh ink being mixed with blobs of older ink left from previous operations. This stream will pass through apertures 16 in drum 12, enter stationary trough 62, and be retained by hollow, stationary spindle 64. This mixture of flushing fluid, ink, and ink blobs is then removed from spindle 64 by means of a vacuum.

At startup, stimulator 51, driven by a 100 KHz driving signal on line 61, stimulates stream 54 to break up into trains of drops. As soon as these drop trains become uniformly sized and spaced, the system is ready for operation. To commence printing, a vacuum is applied to drum 12 and roller 36, and pressure is applied to roller 37. When the paper feed mechanism feeds a print sheet 14 to belts 34 in the region of roller 36, the sheet is picked up by the belts and transported toward roller 37. A set of paper guides (not shown) transfer the sheet from roller 37 to drum 12. Then, the exterior surface 60 of drum 12 is rotated so that a sheet supported thereon is brought under printing head 18. The drops from manifold 46 are selectively charged by a series of charge rings 53, which are in registration with orifices 45. Those drops which are charged are deflected by deflection electrode 49 into catcher 50, while the uncharged drops proceed to deposit on print sheet 14. Drop charging and deflection are carried out as taught by the above mentioned Beam et al and Mathis patents. Drop stimulation may be effected in such a manner that all drops in all streams are generated in phase. For this purpose, a stimulation arrangement such as that taught by Titus et al, U.S. Pat. No. 3,900,162, may be employed, remembering that the arrangement shown in FIG. 2 is a schematic illustration only. However, other drop stimulating arrangements known in the art can be utilized.

Various known printing techniques may be utilized to print tracks of information onto sheet 14. Among them are the interlace printing method taught by Paranjpe et al, U.S. Pat. No. 4,112,469, which uses one or more jet arrays moving axially along a rotating drum upon which a copy sheet is attached. In an array having n nozzles spaced k resolution elements apart, the nozzle array is advanced axially by n resolution elements during each revolution of the drum. The numbers n and k are chosen so that they have no prime factors in common greater than unity. Rotation of the drum and axial movement of the array result in an interlace pattern of print lines which are slightly inclined with respect to the copy paper. Other interlace printing schemes can also be used in the rotary drum copier environment. Among them are the schemes taught in commonly assigned applications Ser. Nos. 833,579, filed Sept. 15, 1977, and 867,669, filed Jan. 9, 1978, to Gamblin. The particular printing scheme chosen will depend on the type of printed matter on documents to be copied and the desired resolution to be obtained.

Referring back to FIG. 1, when the print sheet 14 has been completely printed, printing head 18 activates a trip switch which in turn activates a paper sensor located adjacent to drum 12. The paper sensor senses sheet 14 and, after an appropriate time delay, causes the pneumatic control system to apply a pressure to the interior of drum 12 and a vacuum to the interior of roller 37. This transfers sheet 14 from drum 12 to belts 35. The printed sheet then travels along belts 35 to receiving tray 41. Upon approach to receiving tray 41 a paper sensor causes activation of the pneumatic system to apply pressure to the interior of roller 36. This separates sheet 14 from belts 35, and a set of paper guides (not shown) transfer the sheet to the printed stack 40. A suitable drying means may be placed along the path from drum 12 to receiving tray 41 as required by the drying characteristics of the ink and paper employed, as well as the copy rate.

At the end of each printing cycle, aperture 16 on drum 12 will be controlled so that it is in alignment beneath printing head 18. In this manner, the system is immediately in position for the startup sequence after the desired number of sheets have been printed and the printer has shutdown.

Referring now to FIG. 3, an embodiment is shown having a printing system such as the one disclosed in the commonly-assigned copending application of Gamblin and Marinoff entitled "RECIPROCATING PAPER HANDLING APPARATUS FOR USE IN AN INK JET COPIER", filed on even date herewith. In this printing system 70, printing head 71 is positioned above belts 74 and is driven by synchronous motor 72 and worm 73. Belts 74 have perforations 75 therein which permit the vacuum drawn from plenum chamber 77 to support sheet 76 in proper position. Belts 74 are driven by motors 78 and 79 attached to rollers 80 and 81, respectively. Printing is accomplished, as taught by the aforementioned application, by reciprocating sheet 76 back and forth under printing head 71. As each track of information is printed, printing head 71 advances along worm 73 in a direction transverse to the direction of paper movement.

Figure 4:
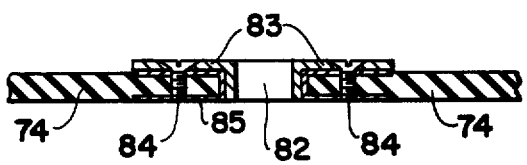
FIG. 4 is a cross-sectional view of the conveyor belt taken along line 4—4 in FIG. 3.

To avoid the necessity of mechanically displacing printing head 71 out of its operating position during startup, an aperture 82 is formed by a slotted sheet metal stop 83 in belts 74. As best illustrated in FIG. 4, sheet metal strip 83 is attached to belts 74 by screws 84 which are countersunk into the strip and screw into metal reinforcing strips 85 on belts 74.

In this manner, belts 74 are aligned during startup so that printing head 71 is directly over aperture 82. Excess flushing fluid, ink blobs, and ink which flow from the printing head during startup fall through aperture 82 into plenum chamber 77. There they can be drawn away by either the same or a different vacuum source attached to plenum 77. After the uniformity of the drop streams issuing from printing head 71 has stabilized, printing is commenced by advancing sheet 76 to a position beneath printing head 71. Strip 83 is narrow and flexible enough so that it can easily bend around the curvature of rollers 80 and 81 during operation of the printing system. Alternatively, the ends of strip 83 may be hinged to permit easier bending of the strip.

While the apparatus herein described constitutes the preferred embodiments of the invention, it is to be understood that the invention is not limited to this precise apparatus, and that changes may be made without departing from the scope of the invention, which is defined in the appended claims.

What is claimed is:

1. In a jet drop printing apparatus for copying or duplicating comprising support means for supporting a print receiving sheet, and
   a printing head including an orifice plate provided with a series of orifices defining an array of jet printing nozzles for generating an array of parallel jets for printing information on a printing medium supported on said support means, the improvement comprising:
   a fluid receiving aperture in said support means extending to the interior thereof and aligned below said printing head for receiving fluid from said printing head during startup of said printing apparatus and
   means for removing fluid from the interior of said support means and connected to said fluid receiving aperture.

2. The apparatus of claim 1 where said support means comprises a rotary drum.

3. The apparatus of claim 1 where said support means comprises an endless conveyor belt.

4. The apparatus of claims 2 or 3 where said fluid removing means comprises a vacuum source in fluid connection with said fluid receiving aperture.

5. In a jet drop printing apparatus for copying or duplicating having a printing head and means for supporting a print receiving sheet having a fluid receiving aperture therein, the method of startup of said apparatus comprising the steps of: aligning said fluid receiving aperture immediately below said printing head, starting fluid flow through said printing head, maintaining said fluid flow until the jets expelled from said printing head are uniform and straight, withdrawing fluid from said fluid receiving aperture as it accumulates, loading a print receiving sheet onto said support means, and moving said support means to align said sheet under said printing head for the commencement of printing.

6. The method of claim 5 where fluid is withdrawn by using a vacuum source.

7. The method of claim 5 where the support means is a drum which is rotated to align the print receiving sheet under the printing head.

8. The method of claim 5 where the support means is an endless conveyor belt which is reciprocated to align the print receiving sheet under the printing head.

9. The method of claim 5 where the fluid expelled from the printing head is initially flushing fluid and later changes to ink after startup.

* * * * *